Dec. 10, 1929.   W. H. DICKERSON   1,739,064
PROCESS FOR THE MANUFACTURE OF A SUGAR PRODUCT
Filed Dec. 29, 1922
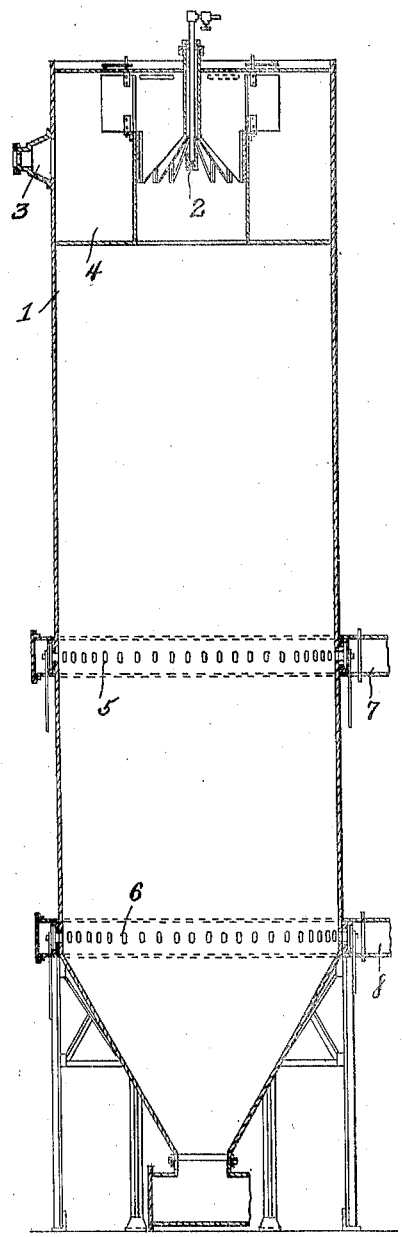
INVENTOR
Walter H. Dickerson
BY
ATTORNEY Patented Dec. 10, 1929

1,739,064

UNITED STATES PATENT OFFICE

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE

PROCESS FOR THE MANUFACTURE OF A SUGAR PRODUCT

Application filed December 29, 1922. Serial No. 609,767.

The invention relates to a novel process for preparing a sugar product on a commercial scale and directly from the unconcentrated and pure untreated juice of sugar producing plants such as sugar-cane, sorghum and beets, etc. The invention, furthermore, relates to the new product obtained by the novel process.

In the well-known processes for obtaining sugar, the latter is recovered from the juice by subjecting it to clarification processes and then evaporating, by multiple or single-effect evaporators, to a density at which the crystallizable sugars are crystallized out, the product being separated from the non-crystallizable portion by centrifuging. The crystal product constitutes what is known as the raw sugar of commerce, and the non-crystallizable product what is known as molasses. The raw sugars are then subjected to refining operations to remove color and to free same entirely from any non-crystallizable products contained therein.

I am aware that it has been proposed, as in U. S. Letters Patent No. 1,201,936, to "reduce the solids of the juice to dryness in an atomizer drier, dissolve the sugars from the dried mass, and reduce the sugars-solution to dryness for final product." The object of the atomization treatment is to insolubilize the non-sugars contained in such juices when freshly extracted from the plant, provided the juice is brought to a state of dryness quickly and without application of heat in high degree. After these insolubilized and so-called "impurities" have been removed, the sugars-solution is reduced in any suitable manner to dryness for the final product.

I have found, on the contrary, that it is highly desirable to retain these so-called "impurities" in the final product and which are absent in sugars as now marketed and as would be in the product obtained by the process set forth in the aforesaid patent. I am aware, furthermore, that such process has never been successfully carried out, in that it was not found possible to dry the juice by atomizing same—one reason for the failure being due to the omission, before collecting, to chill the dry product and while in suspension to a temperature below its critical point, to wit—the point at which caramelization occurs or melting thereof to cause the powder to go into mass condition. As already stated, it is highly desirable to retain these so-called impurities for the same contain salts and are of high vitamin content and of high dietetic value. The drying should, therefore, be so carried out that these original food products, as well as the sugars, remain in substantially unaltered condition in the final dried and powdered product. If the process be properly conducted, the resulting product will be a dry powder and will contain substantially all of the original food elements of the juice in unaltered condition. When made from the juice of the sugar cane, the product also will be substantially colorless; but with the juice of beets, the product will retain the color of the original juice unless initially filtered for the removal of color. The novel product thus obtained, however, is somewhat more hygroscopic than ordinary sugar, containing the non-crystallizable sugars of the original juice.

In carrying out the novel process for the drying to final product directly from the juice of the sugar-producing plants, the fresh juice, after suitable filtration, is atomized or sprayed under suitable conditions to produce directly therefrom a dry powdered product. It may be noted here that the color which is developed in the ordinary process is due to the liming and the heat of the evaporation treatment to which the juice is subjected; and, moreover, that in such treatment many valuable food products are destroyed, particularly the vitamin containing elements. In view of the high percentage of low melting point constituents in the sugar juice, it is ordinarily not possible, therefore, to employ high temperatures as the same, acting on the juice in mass, results in the production of color and various decomposition products.

I have found, however, that after the sugar juice has been filtered from any mechanical dirt, such as shreds of cane, etc., and in the case of sugar beet juice objectionable coloring matter, and introduced in finely-divided state into heated drying gas to drive off the contained moisture, a commercial product is obtainable if the dry products in suspension and at the moment of completion of the drying be subjected to a cooling action prior to collecting the product. This will serve to chill the dried particles below their critical temperature to a non-melting point; and fresh sugar juice may thus be directly treated to obtain same in the form of a dry powdered product which will contain, moreover, all of the original and vital elements in an unaltered condition provided the fruit juice is promptly treated.

In some instances, it may be desirable to heat the sugar juice before being atomized or sprayed; but usually it is preferable, in order to prevent any changes due to temperature action in mass, to atomize or spray the same cold. The atomization may be effected by an air atomizer spray; but it is preferable to employ spraying by high pressure spray heads. In the latter case, the pressures may range from 100 lbs. per square inch up to 2,000 or 3,000 lbs., depending upon the spray head orifice and the size of the particle desired.

I have found in practice that initial temperatures over 212° F. are desirable and may even exceed 1,000° F. It is preferable, however, to use the higher range of temperatures as this enables a much lower poundage of air to be employed. While the maximum initial temperature of the gas that may be used is relatively unimportant, yet, if it be desirable to obtain the natural solids of the sugar juice in a non-altered state, it is necessary that the temperature at the completion of the evaporation of the moisture should not be much over 200°–210° F. It is vital, however, that immediately upon completion of the evaporation of the moisture from the spray dried particle, it should be chilled promptly to a much lower temperature. Temperatures below 150° F. and preferably around 125° F. have been found suitable.

When these conditions are observed, a dry powdered, non-crystalline finished product can be produced from a suitably filtered fresh sugar juice directly and without any intermediate treatment; and this dry powder product will contain all of the vital elements of the valuable food constituents in a completely unaltered condition and in the same condition as present in the original juice of the sugar producing plant.

The novel process may be carried out, for example, in a vertically disposed drying chamber provided by the cylindrical casing 1 which is shown in the drawing, said casing being of appropriate dimensions and into the top of which the material to be dried, and which is in a more or less liquid condition, is sprayed through a spray nozzle 2 of any well-known or special type. Simultaneously therewith, heated gas of the proper degree of temperature is introduced through the top of the casing about the spray nozzle 2, being supplied through a duct 3 and distributing compartment 4. The material thus sprayed becomes quickly dried into small particles which in their travel through the drying chamber are arranged to pass through a cooling zone or zones to chill the same to the desired final temperature, preliminary to withdrawal from said casing. These zones may conveniently be provided through the medium of one or more sets of annular openings 5 and 6 respecitvely disposed in the wall of the casing 1 at its lower portion and through which a gaseous cooling medium may be directed from suitable supply ducts 7 and 8, respectively.

I claim:

1. The method of producing sugar in dry non-crystalline form from the sugar juices ordinarily processed to obtain commercial sucrose which consists in its entirety of filtering raw sugar juice to remove mechanical impurities and objectionable coloring matter, spraying the said filtered juice in finely divided condition into a hot normally gaseous drying medium to remove a substantial portion of the moisture content in said juice, and when the material is dry and while still in suspension in the drying gas, reducing the temperature of the material and the drying gas to thereby directly produce the finished sugar product in dry finely divided form.

2. The hereindescribed process for producing a food product, from the sugar juices ordinarily processed to obtain commercial sucrose which consists in spraying raw sugar juice into a heated gaseous drying medium at an initial temperature exceeding 212° F., and then cooling the dried product at the moment of completion of the drying action and while the product is still in suspension to a temperature below 150° F.

3. A process for the manufacture of a dry finely divided sugar from the raw sugar juices ordinarily processed to obtain commercial sucrose which comprises filtering the raw juice and then converting the said filtered juice into the ultimate dry sugar product in a continuous operation which comprises spraying the said sugar juice in finely divided condition into a current of heated drying gas, permitting the said sprayed material to be carried in suspension in the said gas while being dried, reducing the temperature of the dried sugar product and the spent drying gas to a temperature below the critical temperature of the sugar and then collecting the dried product from the spent drying gas.

4. The method of producing a dry powdered sugar product directly from the raw sugar juices ordinarily processed to produce commercial sucrose which comprises treating the raw juice to free it from suspended matter and to produce a juice of acceptable color and then reducing the treated juice to dry powder form by projecting it in finely divided condition into a current of heated drying gas to thereby rapidly evaporate the water content of the said juice, the sprayed sugar juice and the resulting dehydrated product being carried in suspension in the said current of drying gas, introducing into the current of drying gas and dried product suspended therein a quantity of a substantially cooler gas to intermix with and reduce the temperature of the said current of drying gas and dried product, and collecting the dried product.

5. The process of converting into the form of a substantially dry powder sugar compound of non-crystalline particles a sugar juice prepared from the raw sugar juices ordinarily processed to obtain commercial sucrose without evaporation of said juices to dryness, which comprises in its entirety projecting the said sugar juice in finely divided condition into a heated normally gaseous treating medium to thereby evaporate a substantial portion of the moisture from said juice and reduce the normally solid constituents thereof to the form of small substantially dry non-crystalline particles in suspension in said gas, reducing the temperature of the suspended particles to a temperature below the critical temperature of the sugar and then separating and collecting the said particles from the treating gas as the finished dry powder sugar product.

6. The method of producing in dry powder form material composed of constituents of low melting point which comprises subjecting a finely divided liquid spray of said materal to the action of a hot gaseous medium and when desiccated and while still in suspension in said medium introducing another gaseous medium whose temperature is below that of the low melting point constituents in such quantity as to effect solidification of the said low melting point constituents, then separating the dried solidified product from the drying medium.

Signed at New York in the county of New York and State of New York this 28th day of December A. D. 1922.

WALTER H. DICKERSON.